Dec. 8, 1925.	1,564,311
V. WIKKULA
AUTOMATIC TILE MAKING MACHINE
Filed March 21, 1924    4 Sheets-Sheet 2
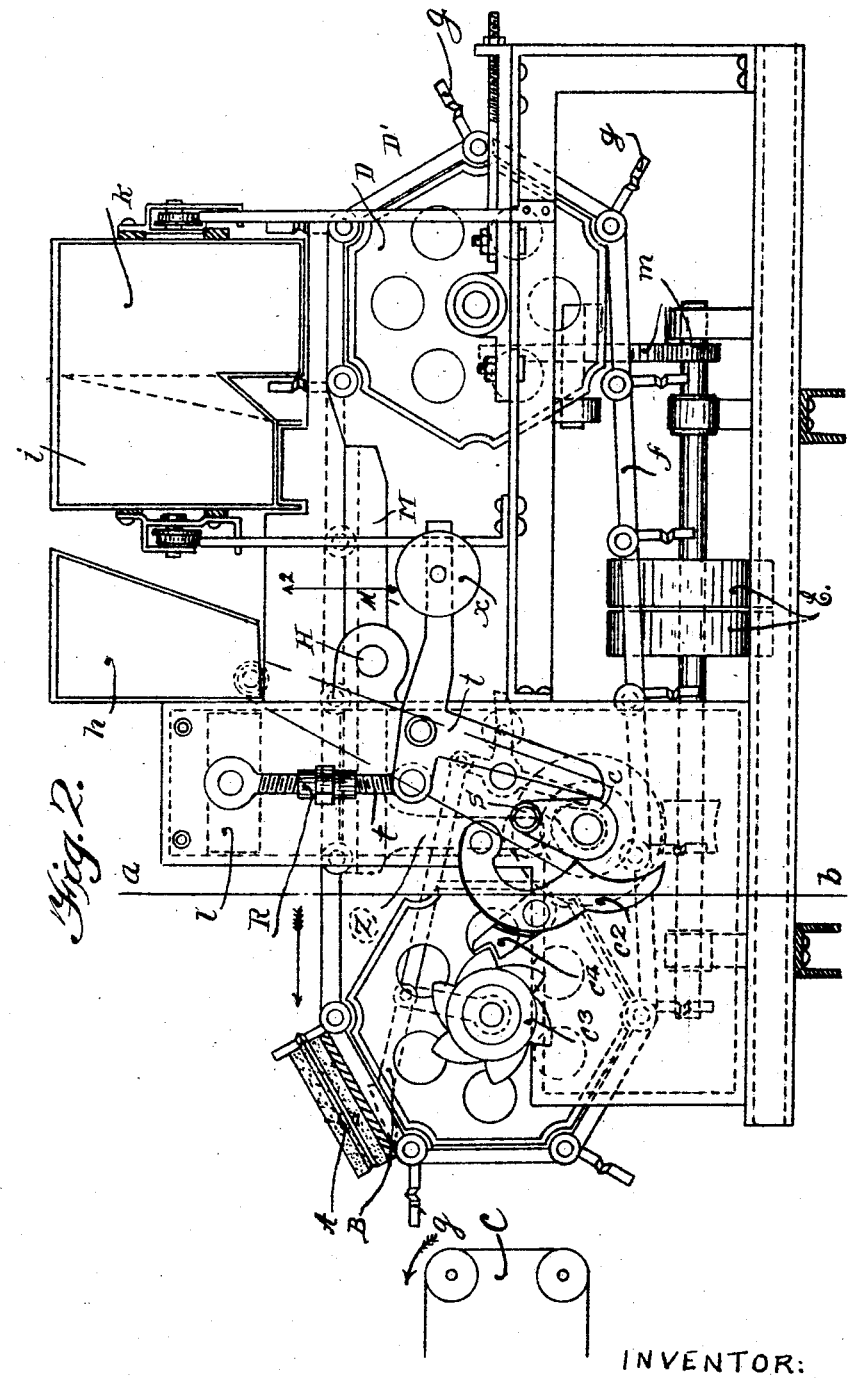
INVENTOR:
Viktor Wikkula
BY: Francis E. Boyce
ATTORNEY

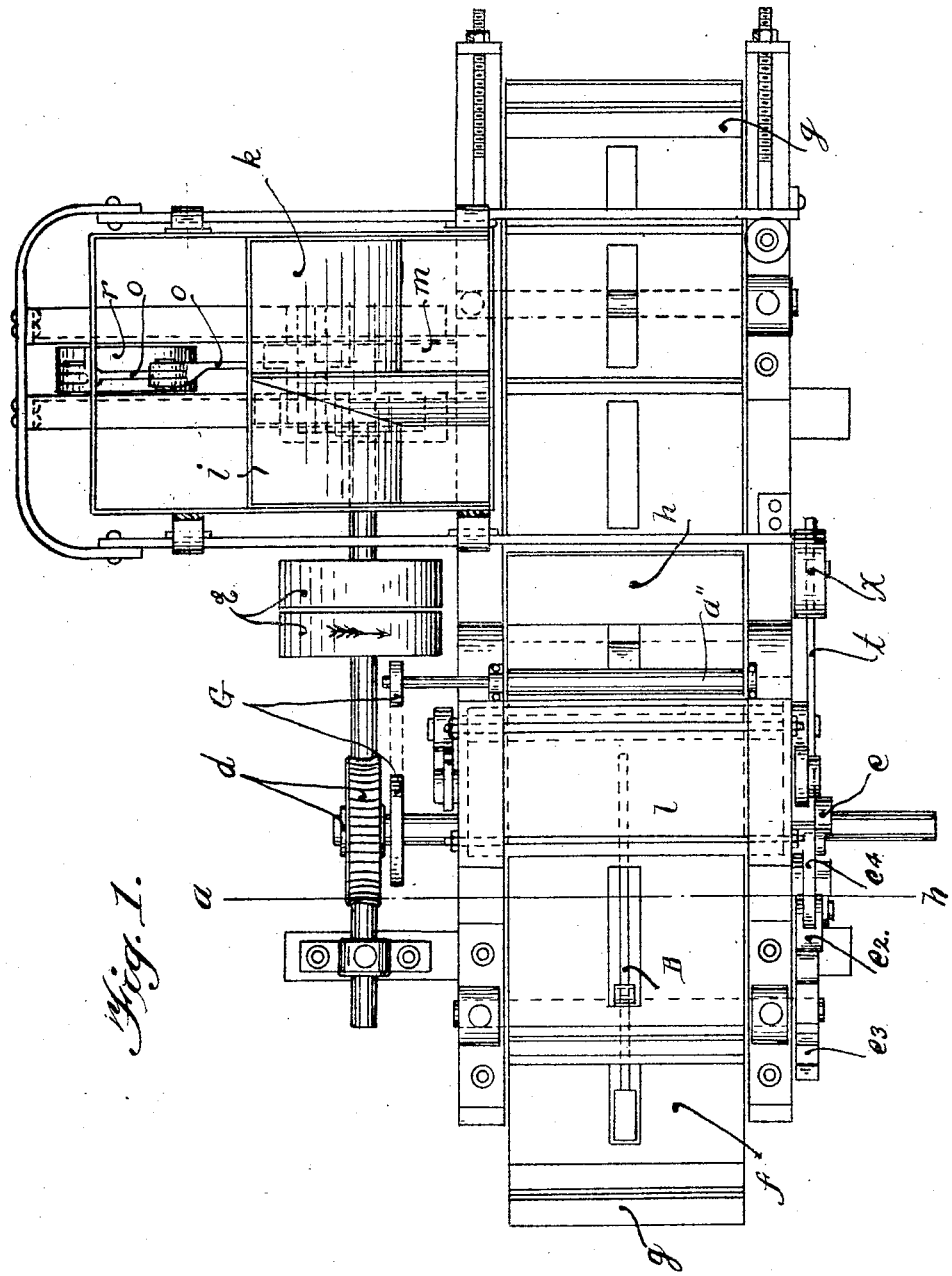

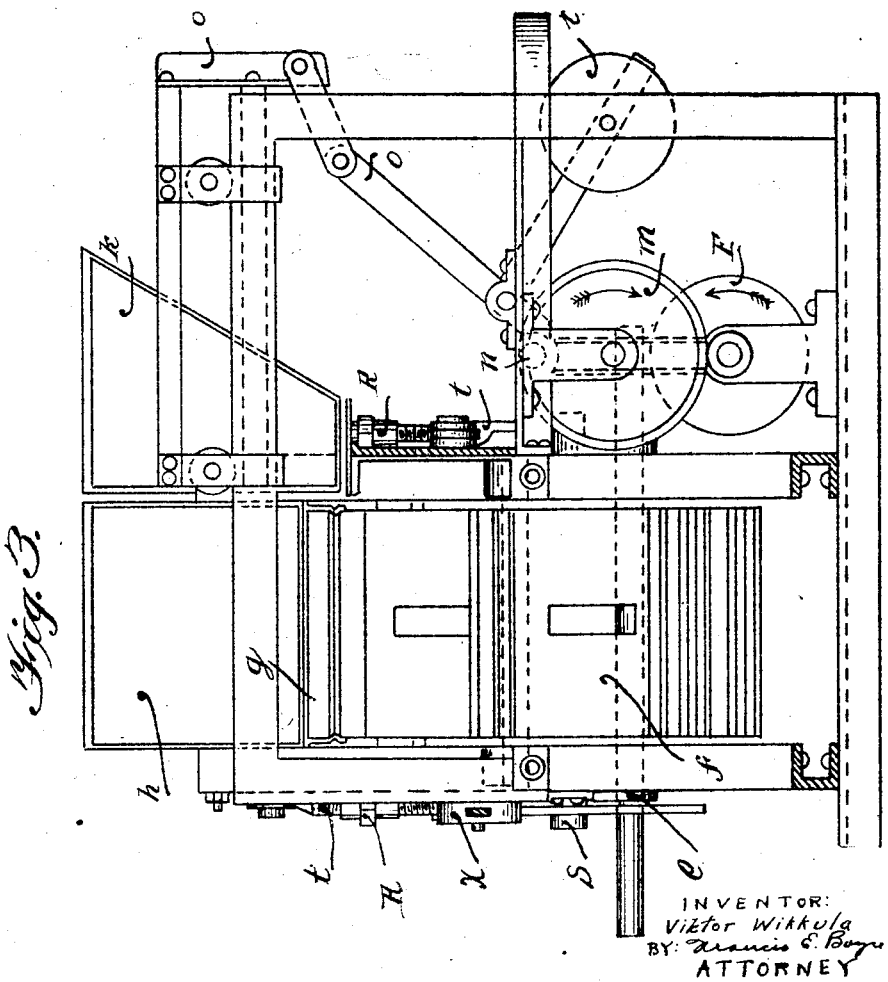

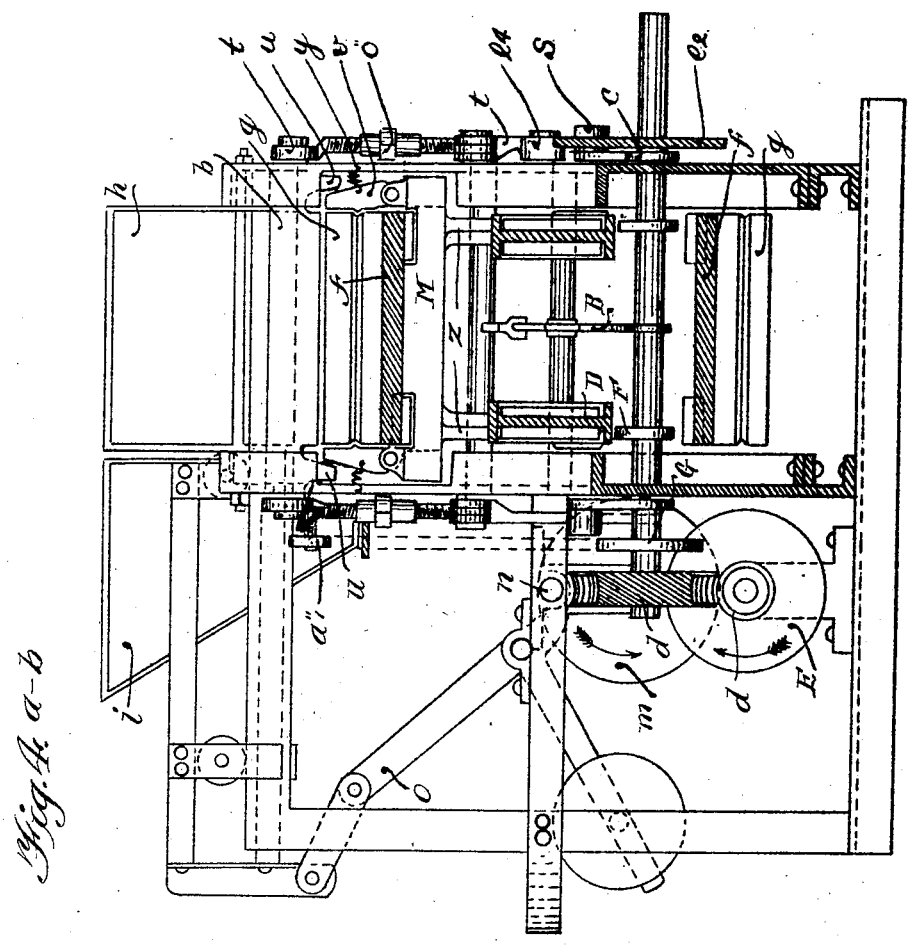

Patented Dec. 8, 1925.

1,564,311

UNITED STATES PATENT OFFICE.

VIKTOR WIKKULA, OF HELSINGFORS, FINLAND.

AUTOMATIC TILE-MAKING MACHINE.

Application filed March 21, 1924. Serial No. 700,795.

*To all whom it may concern:*

Be it known that I, VIKTOR WIKKULA, a subject of the King of Finland, residing at Helsingfors, Finland, have invented certain new and useful Improvements in Automatic Tile-Making Machines, of which the following is a specification.

The production of wall-, floor- and roof-tiles has hitherto had the drawback, that there has not existed any automatic machine, wherewith it would have been possible with sufficient speed and small cost to produce said tiles, wherefore their production has been very expensive.

The present invention has for its object the production of such a machine whereby an endless chain, made of angle-plates, travels over polygonal wheels and a table which automatically balances the movement of the chain, slides forwards at equal steps, taking with it a certain quantity of paste to a press, where an automatic slide- and top-pressure takes place, and thence to a pushing device, which pushes off the complete tile or block to the elevator, for further transport to the store.

In comparison with machines hitherto known the present apparatus has the advantage too, that the paste reservoir is, or several paste reservoirs are, situated above the chain, automatically moving on wheels in the transverse direction, and distributing the paste on the sections of the chain, evenly and in layers, so that the bottom layer, e. g., may be more solid, the inner layers leaner, and the last layer again more solid; both sides, or only one side, may also be colored by introducing special coloring paste reservoirs. The entire mass of paste is evenly distributed on the chain sections, to the desired height, irrespective of the height of the transverse section walls of the chain.

Machines, working according to the above mentioned principles, can be constructed for production of tiles and blocks of any size and thickness.

The construction and function of the machine appears from the drawings enclosed, of which Fig. 1 shows the machine in top view, Fig. 2 in side view, Fig. 3 in front view, and Fig. 4 in section on line *a—b* of Figs. 1 and 2. The motive power comes into the machine through the belt pulley E, Figs. 1–4, in the direction shown in the arrow. The cogwheels *d* and the crank *e* move the endless chain *f*, Figs. 1, 2 and 4, which is running over the polygonal wheels D, in the direction of the arrow, at each period or "step" a distance as long, as the tile or block is broad. When the chain *f* is passing over the polygonal wheels D, the chain is, of course, rising or falling according to the movement of the sides or points of these wheels. But as the chain likewise must run horizontally over the table M, Figs. 2 and 4, it might break in consequence of the rising and falling, caused by the polygonal wheels (because it runs over the table M on its own rails). In order to prevent such a breaking, the polygonal wheels are placed so that, when a point of the front wheel D is up, a side of the back wheel is up, and vice versa. The table M, which supports the chain *f*, is itself supported by the shaft H, Fig. 2, which is situated half-way between the centres of the front and the back wheel D. The table M moves about the shaft H so that it balances the moving of the chain in such a way that, when the fornt part of the chain *f* is lowered with the movement of the polygonal wheel, the front part of the table is also lowered, while the back parts of the machine, on the other side of the shaft H, rise in the same proportion, and vice versa, beginning from the middle of the way the chain *f* makes during one automatic period or "step" of moving forwards. Owing to this movement the chain *f* neither falls nor rises, when it is above the shaft H, which supports the table M. In order to cause an even movement of the table M, in absolute accordance with the movement imparted by the polygonal wheels D to the chain *f*, the supports *z* situated in the front part of the table M, shown in Fig. 4 and in dotted lines in Fig. 2, are pressing against the eccentric wheels F, Fig. 4, and these latter are rotating evenly and automatically, so that the rising and falling of the table M on both sides of the shaft H absolutely corresponds to the rising and falling of the chain *f*, caused by the polygonal wheels D.

During one period or "step" of advancement of a chain section (which occurs so, that the crank *e*, Figs. 1–4, when rotating, pushes the lever $e^2$, and this latter pushes the ratchet wheel $e^3$, Figs. 1 and 2, which is situated at the end of the shaft of the driving wheel D, which moves the chain *f*) the transverse section walls of the chain, *g*, Figs. 1, 2 and 4, have drawn the paste from beneath the reservoirs *h*, *i*, *k*, Figs. 1–4, one "step" forwards, so that the section of chain which was beneath $k$ now is beneath $i$, the section which was beneath $i$ now is beneath $h$, and the section which was beneath $h$ now has advanced beneath the presstop $l$, Figs. 1, 2 and 4, by which all the layers of paste, distributed by the reservoirs, are pressed together to an artificial tile or block.

The reservoirs $i$ and $k$ are mounted on wheels for automatic transverse movement above the chain, like wagonets, which movement takes place when the chain $f$ stands still (i. e. when the crank $e$ rotates free without touching the lever $e^2$), and is caused in such a way, that there has been fastened to the wheel $m$, Figs. 1, 3 and 4, which rotates with the mechanism, a pin $n$ which pushes, by means of a lever arrangement $o$, the reservoir-wagonets $i$ and $k$ transversely above the corresponding section of the chain, at which movement paste is falling evenly down, because the lower edge of the reservoir at the sideway movement mentioned makes even the surface of the paste that has fallen down on the section of the chain. After the advancement of the pin, the wagonets $i$ and $k$ again return sideways, by means of a counterpoise or spring $r$, Figs. 1, 3 and 4, so as to let the chain freely pass forwards.

The reservoir $i$ which distributes the paste designed for the inner part of the tile or block may be divided into several sections, as shown in Figs. 1 and 2, if it should be desirable to have several special mass layers in the tile or block. The reservoirs $i$ and $k$ are situated so as to let paste fall down to the tile or block that is to be made, on the chain $f$, in layers of desired thickness and evenness, without any hindrance from the part of the transverse section walls of the chain, between them, as shown in Fig. 2.

The reservoir $h$ which distributes to the tile or block the last layer of paste, colored or uncolored, may of course be stationary, because it may, contrary to the preceding reservoirs, fill the chain sections up to the transverse walls, and the chain accordingly can slide freely forwards beneath the lower edge of this reservoir. By means of the reservoir $h$ it is also possible to distribute the colored paste, intended for the surface of the tile or block, in several veins, by introducing section walls into this reservoir. In the reservoir $h$, Fig. 2, on a level with its lower edge, there has been placed, in order to prevent particles of stone, etc., in the paste from getting between the lower edge of the reservoir and the transverse section wall of the chain, an automatically rotating roller $a$, Figs. 1 and 2, which by means of intermediary gear G, Figs. 1 and 4, rotates in the desired direction.

From beneath the reservoir $h$ the chain section with the paste comes, at the next advancement or "step" beneath the presstop $l$, which begins to work at the same moment the reservoir-wagonets $i$ and $k$ begin to move transversely above the chain, i. e. when the crank $e$ no more pushes the lever $e^2$, and the pin $s$, Figs. 1-4 in the crank $e$, begins to press against the press lever arrangement $t$, Figs. 1-4, situated on both sides of the machine; the lever arrangement $t$ draws the presstop $l$ a certain distance downwards, pressing the paste on the chain section against its loose bottom. At the same time as the presstop $l$ is pressed downwards, the wedge-shaped side presses $u$, Fig. 4, which are fastened to it, force the short-side presses $v$, Fig. 4, of which there are one or several on both sides of the machine, to press the outer borders of the tile or block into the desired shape. After the pressure has ceased, the counterpoise or spring $x$, Figs. 1, 2 and 3, situated at the end of the press lever arrangement, forces the presstop $l$ to rise upwards; at this time and in the same way the side presses $v$ are liberated from the pressure of the wedges $u$, and by means of counterpoises or springs $y$, Figs. 1-4, they move sidewards, the tile or block thus being freed from their pressure too. The adjusting screws R, Figs. 2-4, are there for regulating the rising height of the presstop $l$; the descending stroke can also be regulated by the same screws.

The tile or block A, Fig. 2, thus completed, has, during the time of two "steps" advanced to the position shown in Fig. 2, wherefrom it by means of the lever device B, Figs. 1, 2 and 4, by a pushing movement against its bottom, is brought with said bottom to the elevator C, Fig. 2, placed before the machine.

The loose bottoms under the tiles or blocks, upon which the paste layers are spread in the machine, against which the pressure takes place, and which render the automatic manipulation with the complete, but yet fresh tiles or blocks possible, are placed on the chain, e. g. at the spot marked $D^1$, Figs. 1 and 2.

What I claim is:

1. An automatic tile making machine, comprising, in combination, an endless traveling member adapted to form molds, means for imparting a step-by-step movement to said member, said means being adapted to raise the member alternately at opposite ends thereof, a rockable table supported beneath a portion of said member, and means for rocking said table coincidently with the raising of the traveling member whereby the table and that portion of the traveling member immediately overlying the table are always in approximate parallelism.

2. An automatic tile making machine, comprising, in combination, an endless traveling member adapted to form molds, means for imparting a step-by-step movement to said member, said means being adapted to raise the member alternately at opposite ends thereof, a rockable table supported beneath a portion of said member, means for rocking said table coincidently with the raising of the traveling member whereby the table and that portion of the traveling member immediately overlying the table are always in approximate parallelism, and automatically operated means for delivering material in separate layers to the traveling member.

3. An automatic tile making machine, comprising, in combination, an endless traveling member adapted to form molds, means for imparting a step-by-step movement to said member, said means being adapted to raise the member alternately at opposite ends thereof, a rockable table supported beneath a portion of said member, means for rocking said table coincidently with the raising of the traveling member whereby the table and that portion of the traveling member immediately overlying the table are always in approximate parallelism, automatically operated means for delivering material in separate layers to the molds, and means for pressing the material in said molds.

4. An automatic tile making machine, comprising, in combination, an endless traveling member adapted to form molds, means for imparting a step-by-step movement to said member, said means being adapted to raise the member alternately at opposite ends thereof, a rockable table supported beneath a portion of said member, means for rocking said table coincidently with the raising of the traveling member whereby the table and that portion of the traveling member immediately overlying the table are always in approximate parallelism, automatically operated means for delivering material in separate layers to the molds, and means for imparting a predetermined shape to the edges of the material in the molds.

5. An automatic tile making machine, comprising, in combination, an endless traveling member adapted to form molds, means for imparting a step-by-step movement to said member, said means being adapted to raise the member alternately at opposite ends thereof, a rockable table supported beneath a portion of said member, means for rocking said table coincidently with the raising of the traveling member whereby the table and that portion of the traveling member immediately overlying the table are always in approximate parallelism, automatically operated means for delivering material in separate layers to the molds, means for pressing the material in said mold to form a compact block, and means for discharging the completed blocks from said molds.

In testimony whereof I affix my signature.

VIKTOR WIKKULA.